(12) United States Patent
Hoglund et al.

(10) Patent No.: US 6,647,483 B1
(45) Date of Patent: Nov. 11, 2003

(54) ADDRESS TRANSLATION CIRCUIT FOR PROCESSORS UTILIZING A SINGLE CODE IMAGE

(75) Inventors: Timothy E. Hoglund, Colorado Springs, CO (US); William M. Ortega, Wichita, KS (US); Roger T. Clegg, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 329 days.

(21) Appl. No.: 09/872,883

(22) Filed: Jun. 1, 2001

Related U.S. Application Data
(60) Provisional application No. 60/273,279, filed on Mar. 1, 2001.

(51) Int. Cl.$^7$ .............................................. G06F 12/02
(52) U.S. Cl. ...................... 711/214; 711/220; 711/153
(58) Field of Search ............................... 711/210, 214, 711/220

(56) References Cited

U.S. PATENT DOCUMENTS 6,212,604 B1 * 4/2001 Tremblay ................... 711/125
6,505,269 B1 * 1/2003 Potter ....................... 711/210 X

OTHER PUBLICATIONS

Webster's Ninth New Collegiate Dictionary; © 1985; entry for —may—; pp. 734–734.*

Microsoft Press Computer Dictionary, 2nd ed.; © 1993; entry for —byte—, p. 59.*

IEEE 100: The Authoritative Dictionary of IEEE Standard Terms, 7th ed.; ©2000, entry for —byte—; p. 132.*

* cited by examiner

*Primary Examiner*—David L. Robertson
(74) *Attorney, Agent, or Firm*—Christopher P. Maiorana, PC

(57) ABSTRACT

A circuit comprising a processor and a translation circuit. The processor may be configured to present a first address. The translation circuit may be configured to (i) determine a mask and an offset, (ii) mask the first address to produce a first masked address, (iii) mask a second address to produce a second masked address, (iv) compare the first masked address with the second masked address, and (v) add the offset to the first address to present a third address in response to the first masked address being at least as great as the second masked address.

19 Claims, 2 Drawing Sheets

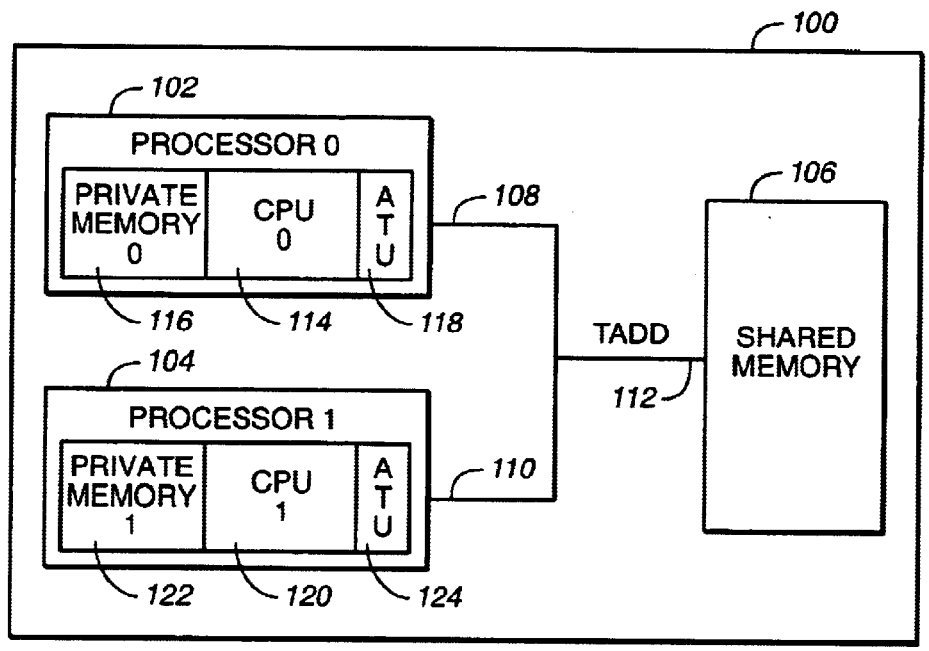
FIG._1
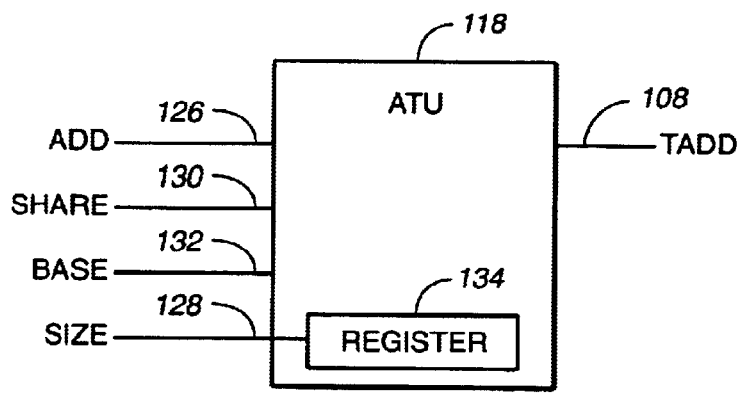
FIG._2
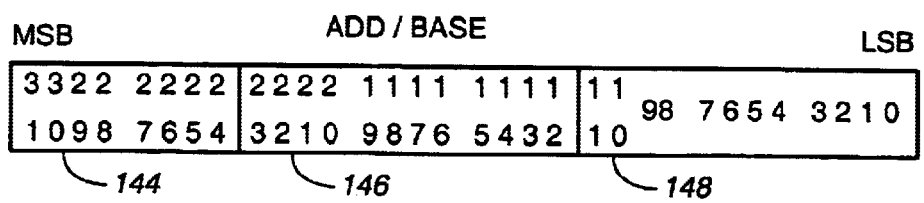
FIG._4

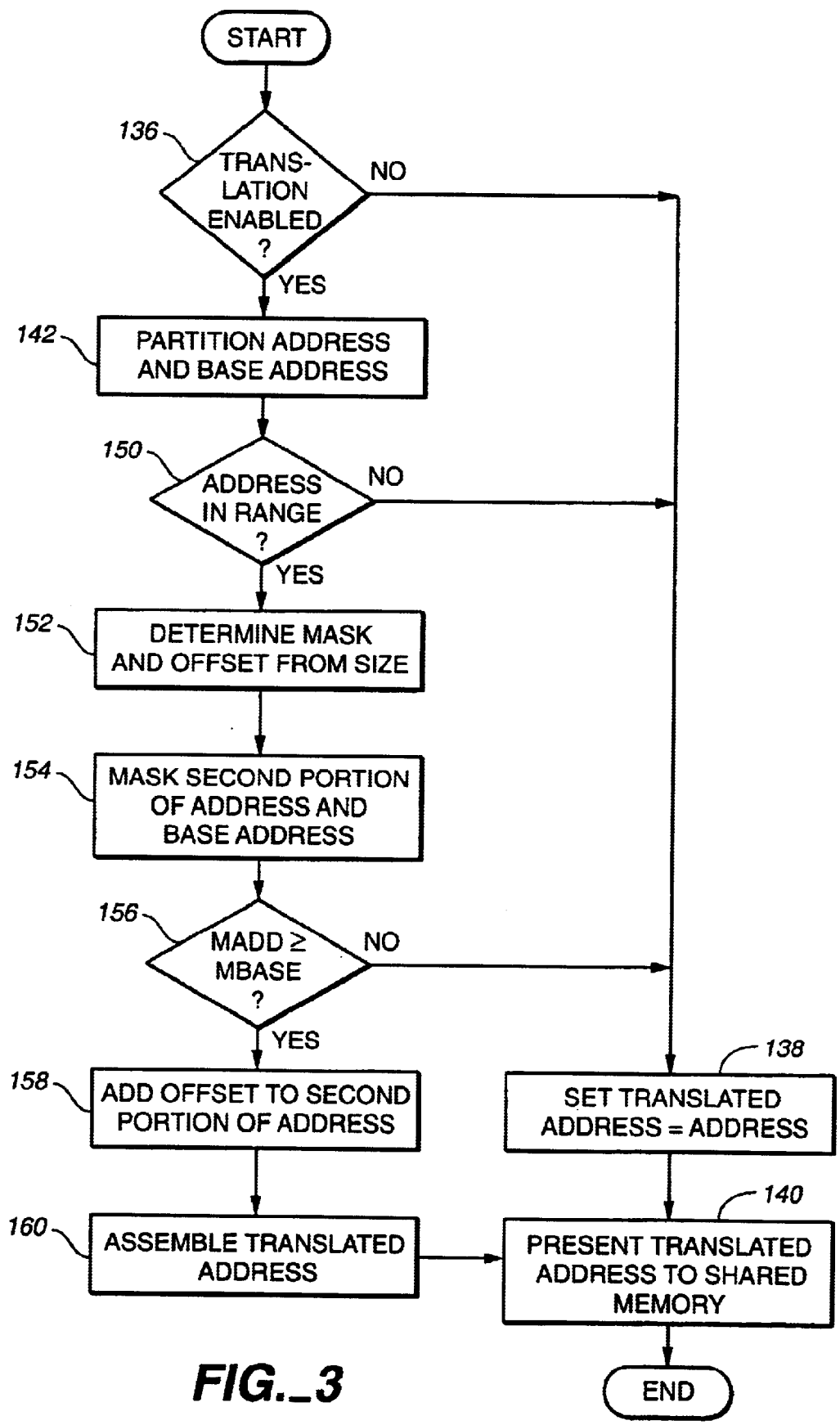
FIG._3

ADDRESS TRANSLATION CIRCUIT FOR PROCESSORS UTILIZING A SINGLE CODE IMAGE

This application claims the benefit of U.S. Provisional Application No. 60/273,279, filed Mar. 1, 2001 which is hereby incorporated by reference in its entirety.

FIELD OF THE INVENTION

The present invention relates to a method and/or architecture for address translation circuits generally and, more particularly, to an address translation circuit for multiple processors utilizing a single code image stored in a shared memory region.

BACKGROUND OF THE INVENTION

Complex embedded control systems often incorporate multiple processors. Each processor has a local block of private memory where a limited amount of code and data unique to that processor are stored. All of the processors also have access to an external block of shared memory where more code and more data are stored. The shared memory provides greater storage capacity than the private memory.

Each processor executes a common binary code image to manipulate the data allocated to the processor. To avoid conflicts between processors within the shared memory, each processor is mapped to a unique address range within the shared memory. Consequently, each processor executing code from the shared memory must have a dedicated copy of the code stored in the shared memory. The dedicated copy of the code must reside within the unique address range for the respective processor. A result is that multiple copies of the same code image must be stored for the multiple processors thus consuming the shared memory. The multiple code images and address mapping, in turn, adds complexity to software management/configuration process for the system.

SUMMARY OF THE INVENTION

The present invention concerns a circuit comprising a processor and a translation circuit. The processor may be configured to present a first address. The translation circuit may be configured to (i) determine a mask and an offset, (ii) mask the first address to produce a first masked address, (iii) mask a second address to produce a second masked address, (iv) compare the first masked address with the second masked address, and (v) add the offset to the first address to present a third address in response to the first masked address being at least as great as the second masked address.

The objects, features and advantages of the present invention include providing a method and/or architecture for address translation circuits that may (i) allow multiple processors to utilize a single code image while providing unique shared memory data storage, (ii) require less memory to store code images, and/or (iii) simplify software configuration management.

BRIEF DESCRIPTION OF THE DRAWINGS

These and other objects, features and advantages of the present invention will be apparent from the following detailed description and the appended claims and drawings in which:

FIG. 1 is a block diagram of a system implementing the present invention;

FIG. 2 is a block diagram of one address translation unit;

FIG. 3 is a flow diagram of a process of translating an address; and

FIG. 4 is a diagram of an address partitioned into three portions.

DETAILED DESCRIPTION OF THE PREFERRED EMBODIMENTS

Referring to FIG. 1, a block diagram of an embedded system 100 is shown in accordance with a preferred embodiment of the present invention. The embedded system 100 may comprise a processor 102, a processor 104, and a shared memory 106. The processor 102 may have an output 108 for presenting a signal (e.g., TADD). The processor 104 may have an output 110 for presenting the signal TADD. The shared memory 106 may have an input 112 for receiving the signal TADD. The signal TADD may be a translated address. In other embodiments, the embedded system 100 may comprise three or more processors.

The processor 102 generally comprises a central processing unit (CPU) 114, a memory 116, and a translation circuit 118. The memory 116 may be a private memory 116. The translation circuit 118 may be an address translation unit (ATU) 118. The processor 104 generally comprises a CPU 120, a memory 122, and a translation circuit 124. The memory 122 may be a private memory 122. The translation circuit 124 may be an ATU 124. The CPU 114 and the CPU 120 may be implemented as any general purpose processor, digital signal processor, RISC processor, CISC processor, pipeline processor, or the like. The private memory 116 and the private memory 122 may be implemented as random access memory, read-only memory, erasable read-only memory, flash memory, or other similar memory suitable for use with the CPU 114 and the CPU 120.

Referring to FIG. 2, a block diagram of the ATU 118 is shown. The block diagram may also be applied to the ATU 124. The ATU 118 may have an input 126 to receive a signal (e.g., ADD) The ATU 118 may have another input 128 to receive another signal (e.g., SIZE). The ATU 118 may have an input 130 to receive a signal (e.g., SHARE). The ATU 118 may have an input 132 to receive a signal (e.g., BASE). The ATU 118 may have the output 108 to present the signal TADD.

The ATU 118 may have a register 134. The register 134 may be called an address translate control register. The register 134 may be used to control the ATU 118. The register 134 may store a signal (e.g., OFFSET) The register 134 may store another signal (e.g., MASK). The signal OFFSET and the signal MASK may be presented by the register 134 in response to the signal SIZE. The following TABLE 1 shows one example of the signal MASK and the signal OFFSET as a function of the signal SIZE:

TABLE 1

| SIZE | MASK (binary) | OFFSET (binary) | Translation Amount |
|---|---|---|---|
| 1 | 1111 1111 1111 | 0000 0000 0001 | 4 KB |
| 2 | 1111 1111 1110 | 0000 0000 0010 | 8 KB |
| 3 | 1111 1111 1100 | 0000 0000 0100 | 16 KB |
| 4 | 1111 1111 1000 | 0000 0000 1000 | 32 KB |
| 5 | 1111 1111 0000 | 0000 0001 0000 | 64 KB |
| 6 | 1111 1110 0000 | 0000 0010 0000 | 128 KB |
| 7 | 1111 1100 0000 | 0000 0100 0000 | 256 KB |
| 0 | 1111 1111 1111 | 0000 0000 0001 | Translate disabled |

The signal ADD may be an address. The signal ADD is generally presented to the ATU 118 by the CPU 114. In one embodiment, the signal ADD may be a 32-bit wide signal.

Other widths of the signal ADD may be implemented to meet the design criteria of a particular application.

The signal SIZE generally indicates a size of the shared memory 106 that is to be used to store data unique to the processor 102. The signal SIZE is generally presented to the ATU 118 by the CPU 114. In one embodiment, the signal SIZE may be implemented as a 3-bit wide signal to accommodate seven possible sizes and a default or non-translatable size. Other widths of the signal SIZE may be implemented to meet the design criteria of a particular application.

The signal SHARE may be an address. The signal SHARE may define a lowest address of the shared memory 106. Any attempt to read or write from the shared memory 106 may generally take place at an address equal to or greater than the signal SHARE. The signal SHARE may be presented to the ATU 118 by the CPU 114, the private memory 116, a register (not shown), hardwired into the processor 102, or from other sources. In one embodiment, the signal SHARE may be implemented as an 8-bit wide signal. Other widths of the signal SHARE may be implemented to meet the design criteria of a particular application.

The signal BASE may be a base address. Addresses presented by the signal ADD to the ATU 118 that have a value below the signal BASE are generally not translated by the ATU 118. Addresses presented by the signal ADD to the ATU 118 that have a value equal to or greater than the signal BASE may be translated by the ATU 118, if translation is enabled. The signal BASE may be presented to the ATU 118 by the processor 114, the private memory 116, a register (not shown), hardwired into the processor 102, or from other sources. In one embodiment, the signal BASE may be implemented as a 12-bit wide signal. Other widths of the signal BASE may be implemented to meet the design criteria of a particular application.

Referring to FIG. 3, a flow diagram of a process for translating the signal ADD is shown. The flow diagram uses the processor 102 as an example. The flow diagram may be applied to the processor 104 as well.

The ATU 118 may first check if address translation is enabled or disabled (e.g., decision block 136). If address translation has been disabled (e.g., the NO branch of decision block 136) then the signal TADD is set equal to the signal ADD (e.g., block 138). The signal TADD may then be presented to the shared memory 106 without translation (e.g., block 140). If address translation has been enabled (e.g., the YES branch of decision block 136), then the signal ADD and the signal BASE may be divided into three portions each (e.g., block 142). An example of the three portions is shown in FIG. 4. In one embodiment, the decision to enable or disable address translation may be determined by the signal SIZE. For example, the signal SIZE may be assigned to a default value when address translation is disabled. A non-default value for the signal SIZE may be used to indicate that translation is enabled.

Referring to FIG. 4, the signal ADD and the signal BASE may be partitioned into three portions as shown. A first portion 144 may include the two most significant sub-portions. A second portion 146 may include the next three sub-portions. A third portion 148 may include the three least significant sub-portions. The first portion 144 generally defines the addressing range of the shared memory 106. The first portion 144 may store bits that do not change for all valid addresses of the shared memory 106. The third portion 148 generally matches the size of the smallest offset that the ATU 118 will shift the signal TADD from the signal ADD. The second portion 146 generally contains the remaining bits not included in the first portion 144 or the second portion 148. Other partitions may be made to meet the design criteria of a particular application.

Returning to FIG. 3, after partitioning the signal ADD and the signal BASE, the ATU 118 may check the first portion 144 of the signal ADD to determine if the CPU 116 is addressing the shared memory 106 (e.g., decision block 150). If the first portion 144 of the signal ADD is not within a predetermined range for the shared memory 106 (e.g., the NO branch of decision block 150), then the signal ADD does not require translation. The ATU 118 may then set the signal TADD equal to the signal ADD (e.g., block 138) and present the signal TADD to the shared memory 106 (e.g., block 140). If the first portion 144 of the signal ADD is within the predetermined range for the shared memory 106 (e.g., the YES branch of decision block 150), then the ATU 118 may determine the signal MASK and the signal OFFSET based upon the signal SIZE (e.g., block 152).

The ATU 118 may then mask the second portion 146 of the signal ADD with the signal MASK to produce another signal (e.g., MADD)(e.g., block 154). The signal MADD may be called a masked address. The ATU 118 may also mask the second portion 146 of the signal BASE with the signal MASK to produce a signal (e.g., MBASE) (e.g., block 154). The signal MBASE may be called a masked base address. The signal MADD may then be compared with the signal MBASE (e.g., decision block 156). The masking process generally allows part of the shared memory 106 to be defined as consecutive instance-unique data regions of increasing size.

If the signal MADD is less than the signal MBASE (e.g., the NO branch of decision block 156), then the ATU 118 may pass-through the signal ADD untranslated. Consequently, the signal TADD may be set equal to the signal ADD (e.g., block 138). The signal TADD may then be presented to the shared memory 106 (e.g., block 140).

If the signal MADD is equal to or greater than the signal MBASE (e.g., the YES branch of decision block 156), then the ATU 118 may translate the signal ADD. Translation may be performed by adding the signal OFFSET to the second portion 146 of the signal ADD (e.g., block 158). The signal TADD may then be assembled by combining the first portion 144 of the signal ADD, the second portion 146 of the signal ADD with the added offset, and the third portion 148 of the signal ADD (e.g., block 160). The ATU 118 may then present the signal TADD to the shared memory 106 (e.g., block 140).

The address translation generally insures that each processor 102 and 104 references instance-unique data regions for data references above a specified base address conveyed by the signal BASE. When address translation is enabled for a processor instance (e.g., processor 102, processor 104), address translation may be performed for references to code and data above the specified base address by adding the signal OFFSET to the signal ADD. The specified base address may be naturally aligned to the specified translation offset (e.g., signal SIZE). The use of the signal MASK may allow the total number of bits that require comparison and manipulation to be less than the total number of bits in the signal ADD.

Typical usage would disable address translation for one processor (e.g., processor 102) and enable address translation for the other processor (e.g., processor 104). The net result may be that the processor 102 and the processor 104 may execute the same code image from the shared memory 106 and still be insured that unique data is maintained elsewhere in the shared memory 106.

Referring again to FIG. 1, an example operation of the embedded system 100 is provided below assuming the following configuration:

Shared Memory Base Address: 0x01000000 (hexadecimal)

Processor 102 ATU Size: 0 (disabled)

Processor 102 ATU Base Address: N/A (translation disabled)

Processor 104 ATU Size: 64 KB

Processor 140 ATU Base Address: 0x01800000 (hexadecimal)

Other configurations may be provided to meet the design criteria of a particular application.

For the processor 102, the signal ADD presented to address the shared memory 106 may be passed-through unmodified (e.g., signal TADD=signal ADD). The signal ADD may be unmodified because the ATU 118 may be disabled due to the non-translatable value (e.g., 0) for the signal SIZE. For the processor 104, the signal ADD presented to address the shared memory 106 between addresses 0x01000000 and 0x017FFFFF may be passed-thru to the shared memory 106 unmodified (signal TADD=signal ADD). The signal ADD may be unmodified because the signal ADD is less than the signal BASE. However, the signal ADD presented to address the shared memory 106 at addresses greater than or equal to 0x01800000 may be translated by the ATU 124. The translation may be such that signal TADD=signal ADD+64K. The translation may allow identical code stored in the shared memory 106 and executed by the processor 102 and the processor 104 to reference unique data stored in the shared memory 106 per processor instance.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:

a processor configured to present a first address; and a translation circuit configured to (i) determine a mask and an offset, (ii) mask said first address to produce a first masked address, (iii) mask a second address to produce a second masked address, (iv) compare said first masked address with said second masked address, and (v) add said offset to said first address to present a third address in response to said first masked address being at least as great as said second masked address.

2. The circuit according to claim 1, wherein said translation circuit is further configured to set said third address equal to said first address in response to said first masked address being less than said second masked address.

3. The circuit according to claim 1, wherein said mask and said offset are determined by a first signal.

4. The circuit according to claim 3, wherein said translation circuit is further configured to set said third address equal to said first address in response to said first signal having a non-translatable value.

5. The circuit according to claim 1, wherein said translation circuit is further configured to set said third address equal to said first address in response to said first address being outside a predetermined range.

6. The circuit according to claim 1, wherein said translation circuit is further configured to:

partition said first address into a first portion, a second portion, and a third portion;

add said offset to said second portion in response to partitioning; and assemble said third address from said first portion, said second portion, and said third portion in response to adding said offset.

7. The circuit according to claim 6, wherein said translation circuit is further configured to partition said second address into said first portion, said second portion, and said third portion.

8. The circuit according to claim 7, wherein said translation circuit is further configured to:

mask said second portion of said first address to produce said first masked address; and mask said second portion of said second address to produce said second masked address.

9. The circuit according to claim 8, wherein said translation circuit is further configured to:

set said third address equal to said first address in response to said first masked address being less than said second masked address;

set said third address equal to said first address in response to a first signal having a non-translatable value; and set said third address equal to said first address in response to said first address being outside a predetermined range.

10. The circuit according to claim 9, wherein said processor is further configured to:

address a code stored in a memory without causing said translation circuit to add said offset to said first address; and address data stored in said memory with causing said translation circuit to add said offset to said first address.

11. A method of translating a first address, comprising the steps of:

(A) determining a mask and an offset;

(B) masking said first address with said mask to produce a first masked address in response to step (A);

(C) masking a second address with said mask to produce a second masked address in response to step (A);

(D) comparing said first masked address with said second masked address; and (E) adding said offset to said first address to produce a third address in response to said first masked address being at least as great as said second masked address.

12. The method according to claim 11, further comprising the step of setting said third address equal to said first address in response to said first masked address being less than said second masked address.

13. The method according to claim 11, wherein said mask and said offset are determined by a first signal.

14. The method according to claim 13, further comprising the step of setting said third address equal to said first address in response to said first signal having a non-translatable value.

15. The method according to claim 11, further comprising the step of setting said third address equal to said first address in response to said first address being outside a predetermined range.

16. The method according to claim 11, wherein said step (E) comprises the sub-steps of:

partitioning said first address into a first portion, a second portion, and a third portion;

adding said offset to said second portion in response to partitioning; and assembling said third address from said first portion, said second portion, and said third portion in response to adding said offset.

17. The method according to claim 16, further comprising the step of partitioning said second address into said first portion, said second portion, and said third portion.

18. The method according to claim 17, wherein (i) said step (B) is masking said second portion of said first address and (ii) said step (C) is masking said second portion of said second address.

19. A circuit comprising:

means for presenting a first address;

means for determining a mask and an offset;

means for masking said first address with said mask to produce a first masked address;

means for masking a second address with said mask to produce a second masked address;

means for comparing said first masked address with said second masked address; and means for adding said offset to said first address to produce a third address in response to said first masked address being at least as great as said second masked address.

\* \* \* \* \*